(12) United States Patent
Strait et al.

(10) Patent No.: US 8,842,701 B2
(45) Date of Patent: Sep. 23, 2014

(54) LTE-ADVANCED PRIMARY SYNCHRONIZATION SIGNAL DETECTION

(71) Applicant: Metanoia Communications Inc., Hsinchu (TW)

(72) Inventors: Jeffrey C. Strait, Reno, NV (US); Emanoil Felician Bors, Grass Valley, CA (US)

(73) Assignee: Metanoia Communications Inc. (TW)

( * ) Notice: Subject to any disclaimer, the term of this patent is extended or adjusted under 35 U.S.C. 154(b) by 143 days.

(21) Appl. No.: 13/627,960

(22) Filed: Sep. 26, 2012

(65) Prior Publication Data

US 2014/0086266 A1 Mar. 27, 2014

(51) Int. Cl.
*H04W 56/00* (2009.01)
*H04J 3/06* (2006.01)
*H04N 21/43* (2011.01)

(52) U.S. Cl.
CPC .............. *H04W 56/00* (2013.01); *H04J 3/0685* (2013.01); *H04J 3/0688* (2013.01); *H04N 21/4305* (2013.01); *H04J 3/0632* (2013.01); *H04J 3/0664* (2013.01)
USPC ......................................................... 370/503

(58) Field of Classification Search
CPC ..... H04J 3/0685; H04J 3/0664; H04J 3/0632; H04J 3/0688; H04N 21/4305; H04W 56/00
USPC ......................................................... 370/503
See application file for complete search history.

(56) References Cited

U.S. PATENT DOCUMENTS

| | | | |
|---|---|---|---|
| 6,271,781 B1* | 8/2001 | Pellon | 341/143 |
| 2009/0295956 A1* | 12/2009 | Chae et al. | 348/294 |
| 2012/0281629 A1* | 11/2012 | Zhou et al. | 370/328 |
| 2012/0307820 A1* | 12/2012 | Tomatis et al. | 370/350 |
| 2013/0083877 A1* | 4/2013 | Gorokhov | 375/354 |
| 2013/0259024 A1* | 10/2013 | Zhang et al. | 370/350 |

* cited by examiner

*Primary Examiner* — Charles C Jiang
*Assistant Examiner* — Thad Defauw
(74) *Attorney, Agent, or Firm* — Han IP Corporation; Andy M. Han

(57) ABSTRACT

Various embodiments of primary synchronization signal detection are provided. In one aspect, a method receives one or more signals at one or more antennas of a receiver. The method processes the one or more received signals by decimation filtering the one or more received signals to provide one or more decimated signals, each of the one or more decimated signals having a predetermined symbol size, and enumerating correlation of the one or more decimated signals with a plurality of reference signals to provide correlation results. The method then detects a primary synchronization signal (PSS) based on the correlation results.

20 Claims, 6 Drawing Sheets

LTE-ADVANCED PRIMARY SYNCHRONIZATION SIGNAL DETECTION

BACKGROUND

1. Technical Field

The present disclosure relates to telecommunication and, more specifically, to wireless communication.

2. Description of Related Art

The new 4G wireless technology standard termed Long Term Evolution-Advanced (LTE-A) utilizes the well-known modulation scheme known as orthogonal frequency division multiple access (OFDMA). It is a multicarrier technique in which the transmit spectrum is divided into K orthogonal subcarriers equally spaced in frequency. The method has been used for many years in both wireline broadband communications and wireless local area networks (WLAN). LTE-A provides a minimum of 1000 Mbps throughput in the downlink (DL) and 500 Mbps in the uplink (UL). The spectral bandwidth for LTE-A is 100 MHz, using up to five component carriers each with a component bandwidth of up to 20 MHz. LTE-A also includes support for both frequency domain duplexing and time domain duplexing.

LTE-A also employs multiple antenna methods such as spatial multiplexing and transmit diversity. Spatial multiplexing (SM) is a multiple-input-multiple-output system (MIMO) formulation enabled by configuring multiple antennas separated in space. The spatially separated antennas provide separate and distinct transmission channels allowing the transmitter-receiver pair to extract independent signals from each channel while cancelling interference from the other transmission paths. When combined, OFDMA and MIMO-SM provide orthogonality in both frequency and space. LTE-A supports up to eight antennas per modem.

Furthermore, LTE-A uses an advanced error correction coding scheme known as Turbo Coding. This is a channel coding method which utilizes a combination of convolutional coding and pseudo random interleaving. The PN interleaver is positioned between two constituent encoders, resulting in near-Shannon limit coding gain when combined with maximum a-posteriori (MAP) decoding.

Ordinarily a given LTE-A base station, referred to as an evolved Node B (eNodeB), is continuously transmitting in the down link (DL) direction and receiving signals in the uplink (UL) direction to/from several user equipment (UE) terminals simultaneously. Whenever a new UE enters the service area of the eNodeB or is otherwise activated (for example by powering up) the new UE searches for an active eNodeB, undergoes a synchronization process, and identifies the network in order to establish communication. The 3GPP standard specification contains several signals and messages to facilitate this process. Specifically, LTE-A contains three types of physical-layer signals which are used in order to allow each UE to synchronize to the eNodeB, including: 1) a primary synchronization signal (PSS), 2) a secondary synchronization signal (SSS), and 3) reference signals.

LTE-A uses OFDMA as the modulation scheme in the DL transmission direction. The UL transmission method is single-carrier OFDMA (SC_OFDMA), also known as discrete Fourier transform (DFT)-spread OFDMA. The DL OFDMA modulation technique utilizes N orthogonal subcarriers with a time-domain symbol length of $N+N_{cp}$ samples, where $N_{cp}$ is the length of a cyclic prefix (CP). The CP consists of $N_{cp}$ samples copied from the end of the length N time-domain symbol and pre-appended in front of the original symbol. The baseband symbol is generated by computing an inverse fast Fourier transform (IFFT) where the frequency domain input consists of N complex quadrature amplitude modulation (QAM) data symbols and the output is N complex time-domain samples. A RF modulator converts the baseband signal to RF by QAM with the RF carrier signal.

After RF down-conversion, the UE receiver recovers the transmitted symbols using a FFT demodulator, reversing the modulation introduced in the eNodeB transmitter.

There are two possible values of OFDMA carrier spacing in LTE-A, namely 7.5 kHz and 15 kHz, which represents the spacing between each of the N carriers over the entire transmit spectrum. Several different FFT sizes N may be used depending on system configuration, including: 128, 256, 512, 1024, 2048, 4096 (with 7.5 kHz carrier spacing). Furthermore, there are three possible sub-symbol modulation specifications, namely QAM, 16QAM, and 64QAM. QAM transmits two bits per carrier using one of four possible symbols. 16QAM transmits four bits per carrier using one of sixteen possible symbols. 64QAM transmits six bits per symbol using one of sixty-four possible symbols. The length of the cyclic prefix $N_{cp}$ is specified as shown in Table 1 below.

TABLE 1

OFDM Parameters

| Configuration | | Cyclic Prefix Length $N_{cp,I}$ |
|---|---|---|
| Normal cyclic prefix | Δf = 15 kHz | 160 for I = 0 |
| | | 144 for I = 1, 2, . . . 6 |
| Extended cyclic prefix | Δf = 15 kHz | 512 for I = 0, 1, . . . 5 |
| | Δf = 7.5 kHz | 1024 for I = 0, 1, 2 |

LTE-A specifies a specific radio frame structure. One radio frame is a 10 ms interval, which consists of 10 subframes with a duration of 1 ms each. Each subframe is composed of two slots each with a duration of 0.5 ms. Each slot contains a number of symbols specified below. There are two possible frame structures defined by LTE-A, and they are shown below. Referring to FIG. 5, frame structure 1 corresponds to frequency domain duplexing (FDD), and frame structure 2 corresponds to time domain duplexing (TDD).

A resource grid is defined in order to facilitate signal transmission and coherent detection. The resource grid is defined over all N carriers in the transit spectrum and over symbol time in the other direction. The DL resource grid is defined in terms of resource elements and resource blocks specified as $N_{RB}^{DL} N_{sc}^{RB}$ subcarriers and $N_{symb}^{DL}$ OFDM symbols, where $N_{RB}^{DL}$ is the number of resource blocks in the DL and $N_{sc}^{RB}$ is the number of subcarriers per resource block. $N_{symb}^{DL}$ is the number of symbols in a resource block, corresponding to one slot (½ sub-frame). With one resource element defined to consist of one carrier with a duration of one symbol, a resource block consists of $N_{RB}^{DL} N_{sc}^{RB} \times N_{symb}^{DL}$ resource elements. The DL resource grid is shown in FIG. 6. Resource block parameters for DL are shown in Table 2 below.

TABLE 2

Physical Resource Block Parameters for Downlink (DL)

| Configuration | | $N_{sc}^{RB}$ | $N_{symb}^{DL}$ |
|---|---|---|---|
| Normal cyclic prefix | Δf = 15 kHz | 12 | 7 |
| Extended cyclic prefix | Δf = 15 kHz | | 6 |
| | Δf = 7.5 kHz | 24 | 3 |

Considering that LTE-A is a multi-antenna MIMO processing system, the resource grid definition as discussed above exists on the transmit signal for each antenna. LTE-A is a variable bandwidth system in which the width of the transmit spectrum varies with the number of carriers and FFT size. As the FFT size is increased, the bandwidth grows out from the DC component in a symmetrical fashion so that the DC carrier is always at the center of the system bandwidth. Both the PSS and SSS occupy carriers in a block of 62 carriers centered in the middle of the frequency band. The PSS is placed in the last symbol of slots 0 and 10 (slots numbered 0-19) and therefore separated by ½ radio frame. Each cell is associated with a cell identification (ID). There are 504 unique physical-layer cell identities given by the following expressions:

$$N_{ID}^{cell} = 3N_{ID}^{(1)} + N_{ID}^{(2)}$$

where:

$N_{ID}^{(1)}$ is in the range of 0 to 167; and $N_{ID}^{(2)}$ is in the range of 0 to 2.

There are three different PSS sequences depending on $N_{ID}^{(2)}$. PSS detection provides the following: 1) symbol boundary alignment, 2) half-frame synchronization, 3) partial cell identification, 4) adjacent cell monitoring, and 5) 62-carrier frequency equalizer (FEQ) reference for SSS detection.

The sequence d(n) used for the primary synchronization signal is generated from a frequency-domain Zadoff-Chu sequence according to the following expression:

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases}$$

where the Zadoff-Chu root sequence index u is given according to the following:

| $N_{ID}^{(2)}$ | Root Index u |
|---|---|
| 0 | 25 |
| 1 | 29 |
| 2 | 34 |

The sequence d(n) is mapped to the resource elements according to the following:

$$a_{k,l} = d(n),$$

$$n = 0, \ldots, 61$$

$$k = n - 31 + \frac{N_{RB}^{DL} N_{sc}^{RB}}{2}$$

For frame structure type 1, the primary synchronization signal is mapped to the last OFDM symbol in slots 0 and 10.

In summary, the primary synchronization signal occupies 62 carriers centered in the middle of the frequency band, is placed in the last symbol of slots 0 and 10 (slots numbered 0-19), and is separated by ½ radio frame.

SUMMARY

Various embodiments pertaining to primary synchronization signal detection in a LTE-A system are described herein. The techniques or algorithms may be implemented in software, firmware, hardware, or any combination thereof.

In one aspect, a method may receive one or more signals at one or more antennas of a receiver. The method may process the one or more received signals by: 1) decimation filtering the one or more received signals to provide one or more decimated signals each of which having a predetermined symbol size, and 2) enumerating correlation of the one or more decimated signals with a plurality of reference signals to provide correlation results. The method may further detect a PSS based on the correlation results.

In at least some embodiments, the processing the one or more received signals may comprise processing the one or more received signals independently and concurrently.

In at least some embodiments, the processing the one or more received signals may comprise processing the one or more received signals independently and sequentially such that one of the one or more received signals is processed at a time.

In at least some embodiments, the processing the one or more received signals may comprise: summing the one or more received signals to provide a summed signal; and processing the summed signal. The decimation filtering the one or more received signals may comprise decimation filtering the summed signal.

In at least some embodiments, the receiving one or more signals may comprise receiving the one or more signals in associated with the LTE-A standard.

In at least some embodiments, the plurality of reference signals may comprise three possible candidate PSS reference signals.

In at least some embodiments, the decimation filtering may comprise decimation filtering in a time domain.

In at least some embodiments, the decimation filtering may comprise decimation filtering in a frequency domain.

In at least some embodiments, the method may further perform one or more of: identifying a cell identification of a cell in which the receiver operates; monitoring an adjacent cell; establishing symbol alignment pursuant to the detecting the PSS; performing half-frame synchronization; and calculating initial frequency equalizer tap values.

In another aspect, a processor may comprise a first module, a second module, and a third module. The first module may be configured to decimation filter one or more signals, received by one or more antennas, to provide one or more decimated signals each of which having a predetermined symbol size. The second module may be configured to enumerate correlation of the one or more decimated signals with a plurality of reference signals to provide correlation results. The third module may be configured to detect a PSS based on the correlation results.

In at least some embodiments, the first module may decimation filter the one or more signals independently and concurrently.

In at least some embodiments, the first module may decimation filter the one or more signals independently and sequentially such that one of the one or more signals is processed at a time.

In at least some embodiments, the first module may sum the one or more signals to provide a summed signal and decimation filters the summed signal.

In at least some embodiments, the plurality of reference signals may comprise three possible candidate PSS reference signals.

In at least some embodiments, the first module may decimation filter in a time domain.

In at least some embodiments, the first module may decimation filter in a frequency domain.

In a further aspect, a computer-readable medium having a set of computer-executable instructions stored thereon that, when executed by one or more processors, may cause the one or more processors to perform operations comprising processing one or more signals received by one or more antennas of a receiver. The processing may comprise: decimation filtering the one or more signals to provide one or more decimated signals each of which having a predetermined symbol size, and enumerating correlation of the one or more decimated signals with a plurality of reference signals to provide correlation results. The operations may further comprise detecting a primary synchronization signal (PSS) based on the correlation results.

In at least some embodiments, the processing one or more signals may comprise processing the one or more signals independently and concurrently.

In at least some embodiments, the processing one or more signals may comprise processing the one or more signals independently and sequentially such that one of the one or more signals is processed at a time.

In at least some embodiments, the processing one or more signals may comprise: summing the one or more signals to provide a summed signal; and processing the summed signal. The decimation filtering the one or more received signals may comprise decimation filtering the summed signal.

In at least some embodiments, the plurality of reference signals may comprise three possible candidate PSS reference signals.

In at least some embodiments, the decimation filtering may comprise decimation filtering in a time domain.

In at least some embodiments, the decimation filtering may comprise decimation filtering in a frequency domain.

In at least some embodiments, the operations may further comprise performing one or more of: identifying a cell identification of a cell in which the receiver operates; monitoring an adjacent cell; establishing symbol alignment pursuant to the detecting the PSS; performing half-frame synchronization; and calculating initial frequency equalizer tap values.

This summary is provided to introduce concepts relating to techniques related to primary synchronization signal detection. Some embodiments of the technique are further described below in the detailed description. This summary is not intended to identify essential features of the claimed subject matter, nor is it intended for use in determining the scope of the claimed subject matter.

BRIEF DESCRIPTION OF THE DRAWINGS

The accompanying drawings are included to provide a further understanding of the disclosure, and are incorporated in and constitute a part of the present disclosure. The drawings illustrate embodiments of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF THE PREFERRED EMBODIMENTS

Overview

Figure 1:
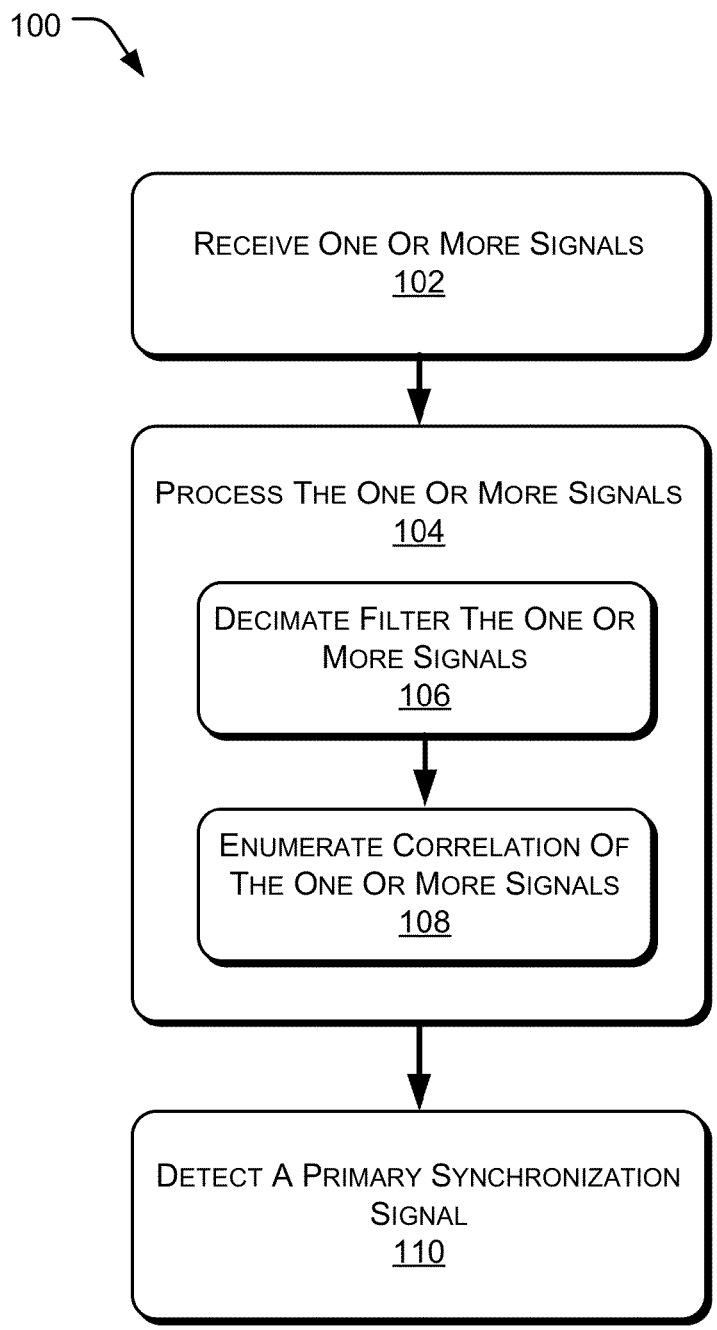
FIG. 1 is a flowchart of a process of primary synchronization signal detection in accordance with an embodiment of the present disclosure.

The proposed techniques of PSS detection may be implemented in software, firmware, hardware, or a combination thereof. When implemented in the form of a PSS detector, the PSS detector contains several functional blocks. The several functional blocks include, using each signal received by each of a plurality of antennas of the UE receiver from a first-in, first-out (FIFO) sample buffer at the front end of the receiver path as an illustrative example: 1) low-pass filtering (LPF) or decimation filtering to decimate to 64-sample symbol size (i.e., 32:1 for a 2048-sample symbol); 2) enumerating correlation with three possible reference primary synchronization signals; 3) summing the signals from all antennas, processing all the antennas independently and concurrently or, alternatively, by cycling through all the antennas one at a time; and 4) detecting a winner, and capturing symbol alignment and half-frame synchronization. PSS detection allows the receiver to compute frequency equalizer (FEQ) taps over the 62 subcarriers centered at DC. This allows frequency domain detection of the SSS.

The structural block diagram of the system depends on the design approach in view of actual implementation. There are several possible approaches that can be used to examine the signals at the front end of the receiver. The signals from the receiver antennas can 1) all be examined independently, 2) be examined sequentially and one at a time, or 3) be summed together and analyzed using a single detector. Furthermore, decimation filtering can be done using either time domain filtering or a frequency domain processing, with the time domain scheme considered here. For the case where the signals are summed, the summation can be done before the decimation, thus reducing the complexity of the implementation. For the other possible case, there are one or more detector paths, and the signals from the antennas are decimated then analyzed using a correlation scheme.

Again, for the case where the signals from all the antennas are summed, the operation includes sample-by-sample addition. The bandwidth around each component carrier is configurable with the FFT size varying from 128 points to 2048 points (for the 15 kHz carrier spacing option). Therefore, the decimation specification is to vary from 128:64 to 2048:64 (or 2:1 to 32:1) in order to generate the 64-point center band signal. The time domain decimation operation involves a low pass filter with a cut-off frequency set at the decimation rate with output samples calculated at the reduced sampling rate. For example, in order to decimate at a rate of 2:1, the low pass filter cut-off frequency is set to $\frac{1}{2}$ where the Nyquist rate is assumed normalized to 1. The output sample of the decimation filter is calculated every other sample to generate a half-rate signal.

The decimated signals are then used as input signals to correlation engines, which calculate the correlation between the inputs and the three possible known reference signals. The correlation operation calculates the convolution of the input signal with a time-reversed version of the reference signals. As correlation procedures, algorithms, and realization engines are well understood by those skilled in the art of communications systems development, a detailed description thereof is not provided herein in the interest of brevity. The correlation engines can be implemented in hardware, software or a combination thereof, using either time-domain techniques or frequency domain techniques.

The PSS detection logic follows using the output signals from one or more correlation engines. The correlation output produces an estimate of the channel impulse response, with additive noise, whenever the correct reference signal is used in the correlation function. Namely, for a linear system, given an input signal and a transmission path impulse response, the correlation of the input signal with the system output signal gives an estimate of the impulse response. If an incorrect reference signal is used, then there is no correlation between the output of the correlation operation and the candidate reference signal. The purpose of the detection logic is to analyze the correlation output signal and discern whether or not the signal represents a reasonable estimate of a transmission path impulse response. If it is discerned that the signal represents a reasonable estimate, a decision is made that the candidate reference signal was transmitted by the eNodeB transmitter, and an estimate of the symbol boundary is calculated along with half-frame synchronization.

Example Software Implementation

A detection block in accordance with the present disclosure first searches the radio frame for the peak signal level. An example Matlab code which implements this function is as follows:

```
% Peak detection
DetectResult = [ ];
PssPeakDetIndex = 0;
PssPeakLevel = 0;
for Index=1:length(CorrDetectOut)
    if CorrDetectOut(Index) > PssPeakLevel
        PssPeakDetIndex = Index;
        PssPeakLevel = CorrDetectOut(Index);
    end
end
```

Here, CorrDetectOut( ) is the correlation operation output signal for one of the candidate reference signals. The length of the correlation output signal is used as the search region; however, it should be noted that this is to be at least one radio frame in order to capture both PSS signals (per radio frame). The code produces both the signal peak, PssPeakLevel( ), as well as the index within the frame pointing to the peak, PssPeakDetIndex( ). The detector then searches for an accompanying signal peak at or near the peak level identified by the previous operation, within a certain allowable tolerance which can be tuned by the designer based on system noise levels. The accompanying peak is separated in time by one half frame, within a tunable tolerance specified by the designer. An example code implementing the algorithm is as follows:

```
% Find both PSS symbols in the frame
for Index=1:length(CorrDetectOut)
    if CorrDetectOut(Index) > PssDetThreshold*PssPeakLevel
        if (CorrDetectOut(Index) > CorrDetectOut(Index-1)) &
                (CorrDetectOut(Index) > CorrDetectOut(Index+1))
            DetectResult = [DetectResult;Index];
        end
    end
end
```

The variable PssDetThreshold is the tunable threshold parameter which specifies a minimum detection level in order to identify the second peak in the frame. DetectResult is an array which holds the index pointers to signal peaks, within the specified tolerance, contained in the frame.

The next step is to determine which, if any, of the primary synchronization signals was sent. The following example code can be executed using the peak detection results from the previous stage:

```
% Initialize PSS detector decision
Nid2RX = −1;
% Decide which PSS was transmitted − first test for Nid2=0
for Index=1:length(DetectResult)−1
    if length(DetectResult)>1
        if (DetectResult(Index+1)−
                DetectResult(Index)<NumFrameSamplesDown/2
                                    +PeakDetWinSize/2)
            if (DetectResult(Index+1)−
                    DetectResult(Index)>NumFrameSamplesDown/2−
                                                    PeakDetWinSize/2)
                fprintf(1,'%s%d%s\n','Primary Sync Signal Nid2 = ',0,' detected');
                DetectResult;
                Nid2RX = 0;
            end
        end
    end
end
```

The variable PeakDetWinSize is designer tunable to specify an allowable tolerance window of samples about the half-frame spacing in which the two peaks in a frame are to be located. In the event that more than one reference signal is identified by this process, a tie breaker is proposed that simply calculates the peak signal-to-noise ratio for each correlation output signal declaring the winner to be the correlator with the highest result. The reason for this is that it is possible for a random signal to contain two peaks which satisfy the detection criterion. However, if a reference signal is contained in the transmission, legitimate detection would show a large peak-to-noise ratio. If the variable Nid2RX survives the test for all three reference signals while maintaining the initialization value of −1, then the detector failed to identify an LTE-A transmission.

Once the winning candidate reference signal is identified, if present at all, then the symbol and half-frame estimates are available by taking the index values as pointers. Furthermore, the now-known reference signal provides a frequency domain reference signal that can be used to directly calculate frequency domain equalizer tap values for the carriers used to transmit the PSS.

Example Process

FIG. 1 illustrates a process 100 of primary synchronization signal detection in accordance with an embodiment of the present disclosure.

Example process 100 includes one or more operations, actions, or functions as illustrated by one or more of blocks 102-110. Although illustrated as discrete blocks, various blocks may be divided into additional blocks, combined into fewer blocks, or eliminated, depending on the desired implementation. Further, process 100 may be implemented by software, hardware, or a combination of software and hardware in any type of computing device, such as example processors 200 and 300, and example computing device 400 to be described below. For illustrative purposes, the operations described below are performed by a processor of a computing device. Processing may begin at block 102.

Block 102 (Receive One Or More Signals) may include receiving one or more signals at one or more antennas of a receiver. The process 100 may proceed from block 102 to block 104.

Block 104 (Process The One Or More Signals) may include processing the one or more received signals. More specifically, block 104 may include sub-blocks 106 and 108. Sub-block 106 (Decimate Filter The One Or More Signals) may include decimation filtering the one or more received signals to provide one or more decimated signals each of which having a predetermined symbol size. Sub-block 108 (Enumerate Correlation Of The One Or More Signals) may include enumerating correlation of the one or more decimated signals with a plurality of reference signals to provide correlation results. The process 100 may proceed from block 104 to block 110.

Block 110 (Detect A Primary Synchronization Signal) may include detecting a PSS based on the correlation results.

In at least some embodiments, the processing the one or more received signals comprises processing the one or more received signals independently and concurrently.

In at least some embodiments, the processing the one or more received signals comprises processing the one or more received signals independently and sequentially such that one of the one or more received signals is processed at a time.

In at least some embodiments, the processing the one or more received signals comprises summing the one or more received signals to provide a summed signal, and processing the summed signal. In at least some embodiments, the decimation filtering the one or more received signals comprises decimation filtering the summed signal.

In at least some embodiments, the receiving one or more signals comprises receiving the one or more signals in associated with the LTE-A standard.

In at least some embodiments, the plurality of reference signals comprise three possible candidate PSS reference signals.

In at least some embodiments, the decimation filtering comprises decimation filtering in a time domain.

In at least some embodiments, the decimation filtering comprises decimation filtering in a frequency domain.

In at least some embodiments, the process 100 further performs one or more of: identifying a cell identification of a cell in which the receiver operates; monitoring an adjacent cell; establishing symbol alignment pursuant to the detecting the PSS; performing half-frame synchronization; and calculating initial frequency equalizer tap values.

Figure 4:
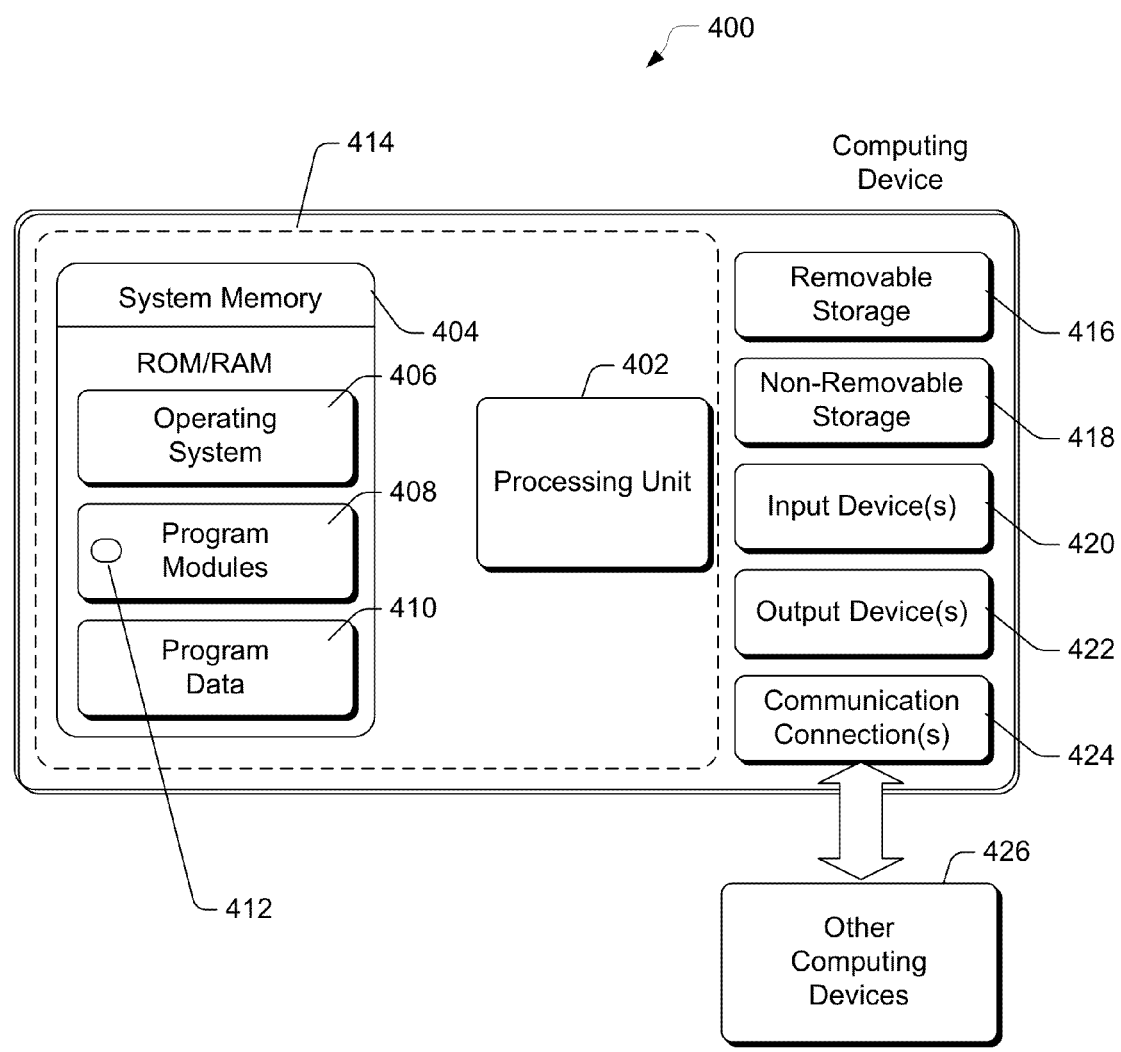
FIG. 4 is a block diagram of a computing device capable of implementing primary synchronization signal detection in accordance with an embodiment of the present disclosure.
Figure 5:
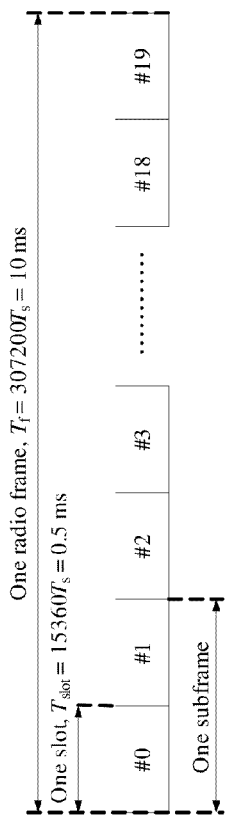
FIG. 5 shows two types of frame structures defined in the LTE-A standard.
Figure 5:
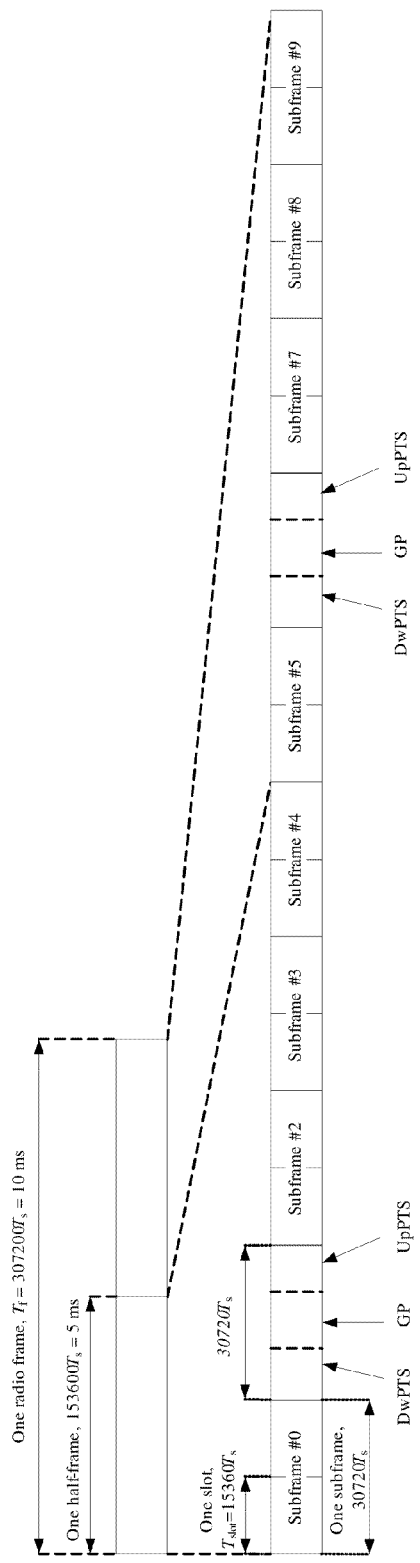
Figure 6:
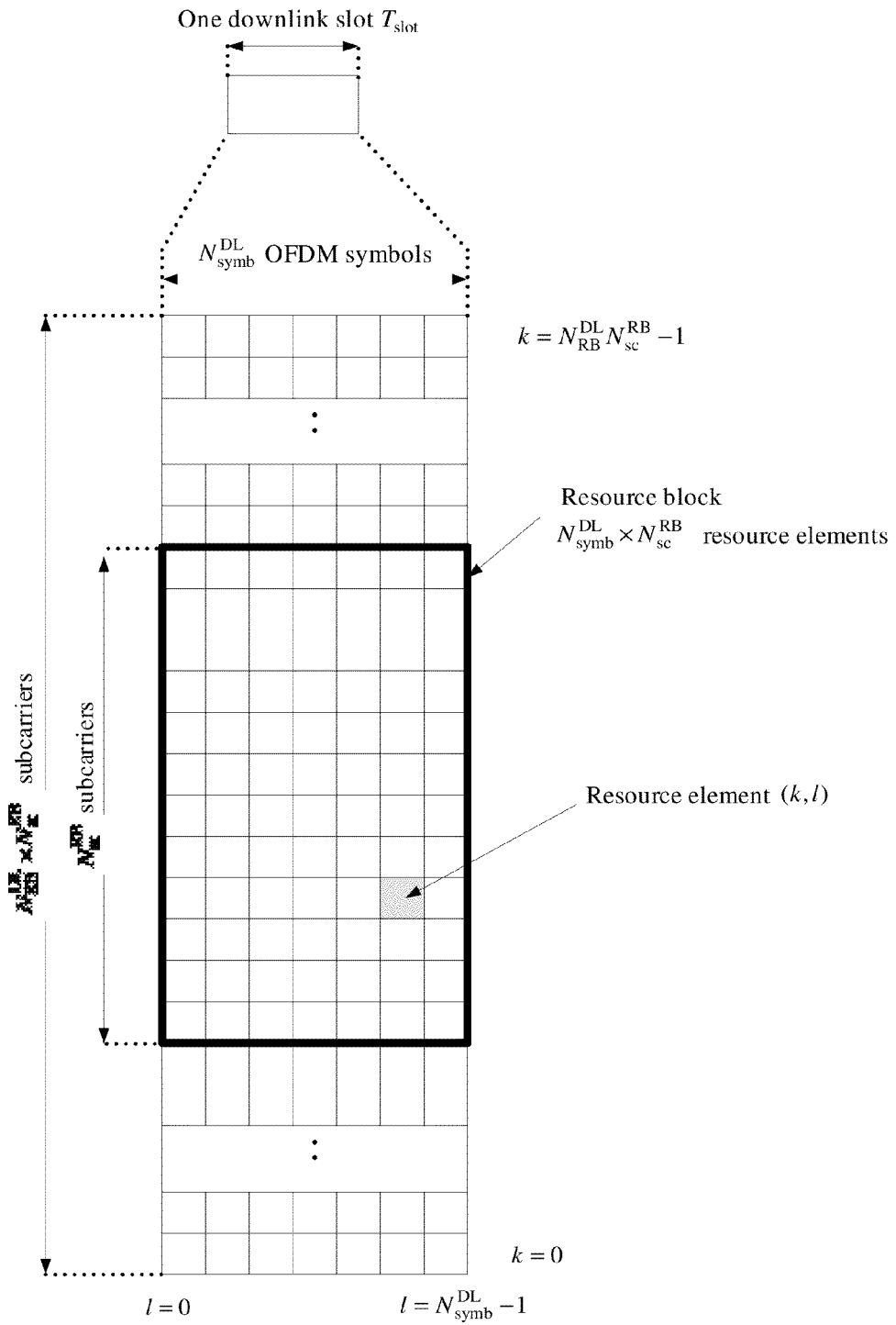
FIG. 6 shows a downlink resource grid defined in the LTE-A standard.

The process 100 or any variations thereof may be carried out as a result of executing computer-executable instructions, e.g., computer programming codes, stored on one or more non-transitory computer-readable medium, herein interchangeably referred to as computer-readable storage medium, by a processor, a central processing unit, a computing device such as, for example, the computing device 400 of FIG. 4. Such one or more computer-readable medium may be one or more tangible storage device including, but not limited to, random access memory (RAM), read-only memory (ROM), electrically erasable programmable read-only memory (EEPROM), flash memory or other memory technology, compact disc read-only memory (CD-ROM), digital versatile disks (DVD), any optical storage, magnetic cassettes, magnetic tape, magnetic disk storage or other magnetic storage devices, or any other non-transitory medium which can be used to store the desired information now known or later developed and which can be accessed by a processor, a central processing unit, a computing device such as, for example, the computing device 400 of FIG. 4. In the present disclosure, the term "one or more computer-readable medium" does not encompass any non-tangible or transitory propagating signal such as, for example, electromagnetic or acoustic signal or waveform and shall not be interpreted as such.

Example Processors

Figure 2:
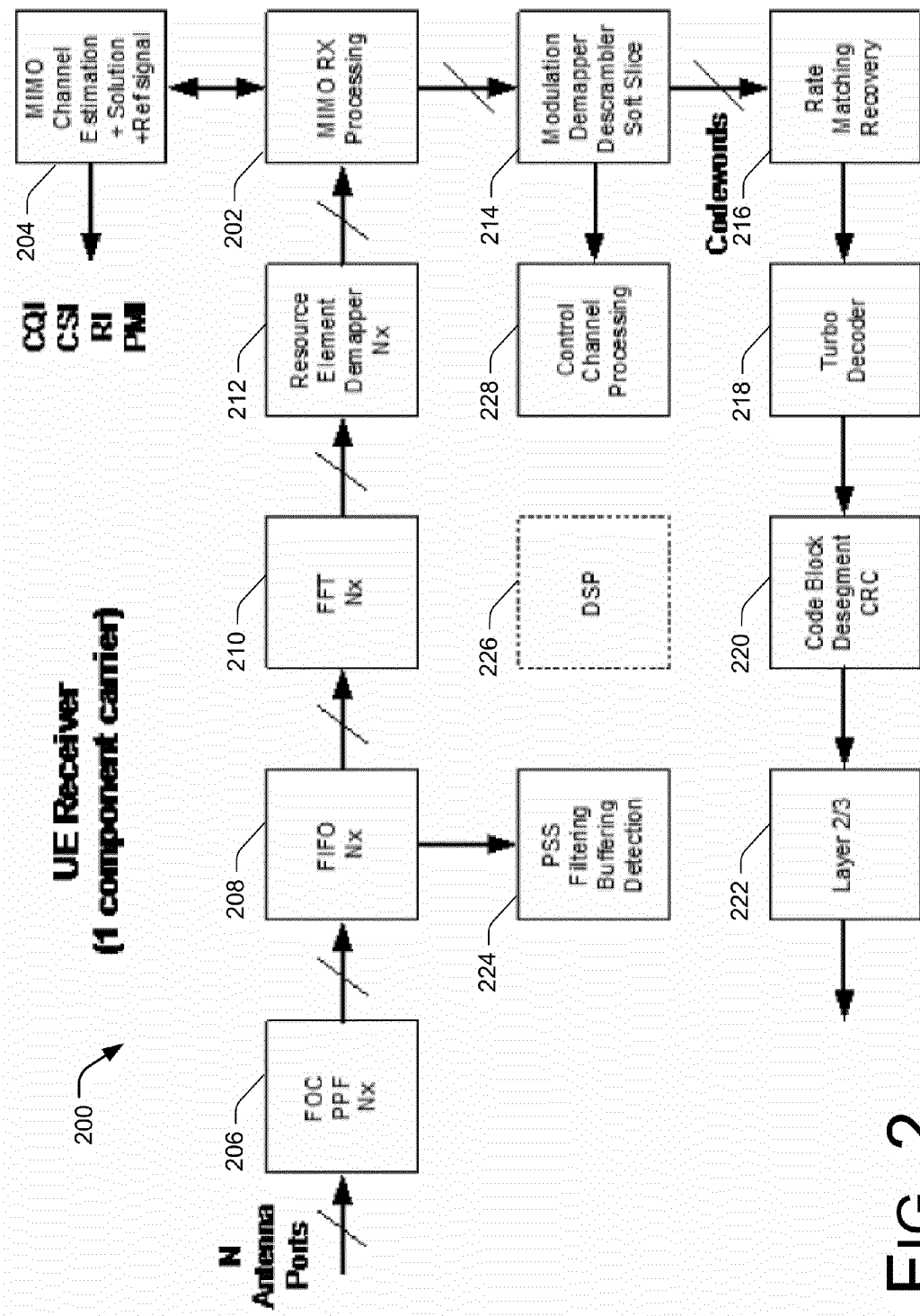
FIG. 2 is a block diagram of components a processor in a receiver capable of implementing primary synchronization signal detection in accordance with the present disclosure.

FIG. 2 illustrates components of a processor 200 in a receiver that is capable of primary synchronization signal detection in accordance with the present disclosure, including the process 100 and any variation thereof. Processor 200 may be a microprocessor, for example.

The components of the processor 200 depicted in FIG. 2 are for one component carrier. As the same design and operating principle described and depicted herein can be repeated and used for multiple component carriers, in the interest of brevity components for multiple component carriers will not be illustrated or described.

As shown in FIG. 2, the processor 200 comprises a MIMO receiver processing module 202 and a MIMO channel estimation module 204. The MIMO channel estimation module 204 is configured to generate estimates of channel matrix elements with respect to C channels, where C is a positive integer greater than 1. The MIMO receiver processing module 202 is coupled to the MIMO channel estimation module 204. The MIMO receiver processing module 202 is configured to receive a first input that includes signals transmitted by M transmit antennas on the C channels and received by N receive antennas, where M and N is each a positive integer greater than 1. The MIMO receiver processing module 202 is also configured to receive, from the MIMO channel estimation module, a second input that includes the estimates of channel matrix elements with respect to C channels. The MIMO receiver processing module 202 is further configured to generate an output that includes at least an estimate of a transmit signal transmitted by one of the M transmit antennas on one of the C channels based at least in part on the first and the second inputs.

The MIMO channel estimation module 204 calculates the transmission channel matrix by using a number of reference signals that are embedded in the signal and resource structure. The reference signals are known to the receiver and are interspersed in both time and frequency. For each carrier, wherever the reference signals are located on the time/frequency/antenna resource grid, the signal on all other antenna ports corresponding to the same time and frequency position is set to zero to eliminate interference from the other antennas. By doing so, the transmission path from the active transmit antenna port to all the possible receive antenna ports can be calculated. This allows calculation of all of the possible channel matrix elements from each transmitter port to each receiver port, completing the channel matrix.

The processor 200 may also comprise a frequency offset compensation (FOC) module 206, a first-in, first-out (FIFO) sample buffer 208, a fast Fourier transform (FFT) demodulator 210, a resource element demapper 212, a modulation demapping, descrambling and soft slicing module 214, a rate matching recovery module 216, a turbo decoder 218, a code block desegment cyclic redundancy check (CRC) module 220, a layer 2/3 processing module 222, a primary synchronization signal filtering, buffering and detection module 224.

The frequency offset compensation module 206 adjusts the sample timing of the receiver to match that of the far end transmitter. It does this by using a poly-phase filter with interpolated re-timing of the sampling process. It then branches to feed the primary synchronization signal filtering, buffering and detection module 224, which is a detection mechanism for the primary synchronization signal. The first-in, first-out (FIFO) sample buffer 208 is written with new samples as they are received, and the oldest samples are removed for further digital processing. Following the first-in, first-out (FIFO) sample buffer 208 is the fast Fourier transform demodulator 210. Multicarrier transmission schemes such as discrete multi-tone (DMT) and OFDM use the inverse FFT as the signal modulator and the FFT as the demodulator. Following the fast Fourier transform demodulator 210 is the resource element demapper 212, which extracts data from specific locations across time and frequency, as allocated by a high level resource management algorithm.

At this point the MIMO processing functionality, which is partially covered by the material in this application, is addressed. The output of the MIMO receiver processing module 202 is fed to the modulation demapping, descrambling and soft slicing module 214, which handles modulation demapping, descrambling, and soft slicing to prepare the signal for the rate matching recovery module 216 and turbo decoder 218. The modulation demapping, descrambling and soft slicing module 214 also provides an output to a control channel processing module 228. Layer 2/3 processing follows. The processor 200 may further comprise a digital signal processor (DSP) 226 used to manage signal flow, hardware configuration, and simple calculations, and control channel processing machinery.

In at least some embodiments, the primary synchronization signal filtering, buffering and detection module 224 is configured to carry out techniques pertaining to primary synchronization signal detection in accordance of the present disclosure. For example, the primary synchronization signal filtering, buffering and detection module 224 may be configured to perform operations of process 100 as described above.

Figure 3:
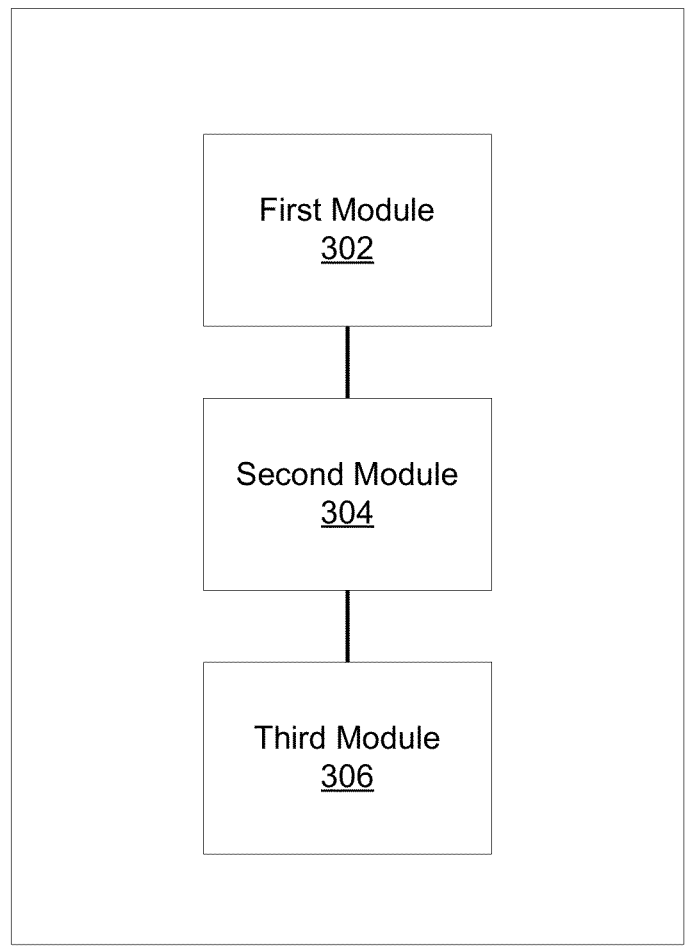
FIG. 3 is a block diagram of a processor, or a functional block of a processor, capable of implementing primary synchronization signal detection in accordance with the present disclosure.

FIG. 3 illustrates a processor 300, or a functional block of a processor, capable of implementing primary synchronization signal detection in accordance with the present disclosure. Processor 300 may be a microprocessor, for example. Alternatively, processor 300 may be a functional block of a microprocessor, such as the primary synchronization signal filtering, buffering and detection module 224 in processor 200.

Processor 300 includes a first module 302, a second module 304, and a third module 306. The first module 302 is configured to perform decimation filtering of one or more signals, received by one or more antennas, to provide one or more decimated signals each of which having a predetermined symbol size. The second module 304 is configured to perform enumerating correlation of the one or more decimated signals with a plurality of reference signals to provide correlation results. The third module 306 is configured to perform detection of a PSS based on the correlation results.

In at least some embodiments, the first module 302 decimation filters the one or more signals independently and concurrently.

In at least some embodiments, the first module 302 decimation filters the one or more signals independently and sequentially such that one of the one or more signals is processed at a time.

In at least some embodiments, the first module 302 sums the one or more signals to provide a summed signal and decimation filters the summed signal.

In at least some embodiments, the plurality of reference signals comprise three possible candidate PSS reference signals.

In at least some embodiments, the first module 302 decimation filters in a time domain.

In at least some embodiments, the first module 302 decimation filters in a frequency domain.

Example Computing Device

FIG. 400 illustrates a representative computing device 400 that may implement the transmit diversity decoding scheme in accordance with an embodiment of the present disclosure. However, it will be readily appreciated that the techniques disclosed herein may be implemented in other computing devices, systems, and environments. The computing device 400 shown in FIG. 4 is only one example of a computing device and is not intended to suggest any limitation as to the scope of use or functionality of the computer and network architectures.

In at least one configuration, computing device 400 typically includes at least one processing unit 402 and system memory 404. Depending on the exact configuration and type of computing device, system memory 404 may be volatile (such as RAM), non-volatile (such as ROM, flash memory, etc.) or some combination thereof. System memory 404 may include an operating system 406, one or more program modules 408, and may include program data 410. The computing device 400 is of a very basic configuration demarcated by a dashed line 414. Again, a terminal may have fewer components but may interact with a computing device that may have such a basic configuration.

In one embodiment, the program module 408 includes a primary synchronization signal detection module 412. The primary synchronization signal detection module 412 can carry out one or more functionalities and processes as described above with reference to FIGS. 1-3. For example, when the primary synchronization signal detection module 412 is properly configured, the computing device 400 can carry out the operations of process 100 of FIG. 1 and variations thereof.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by removable storage 416 and non-removable storage 418. Computer-readable storage media may include volatile and nonvolatile, removable and non-removable media implemented in any method or technology for storage of information, such as computer-executable instructions, data structures, program modules, or other data. System memory 404, removable storage 416 and non-removable storage 418 are all examples of computer storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of the computing device 400. Computing device 400 may also have input device(s) 420 such as keyboard, mouse, pen, voice input device, touch input device, etc. Output device(s) 422 such as a display, speakers, printer, etc. may also be included.

Computing device 400 may also contain communication connections 424 that allow the device to communicate with other computing devices 426, such as over a network. These networks may include wired networks as well as wireless networks. Communication connections 424 are some examples of communication media. Communication media may typically be embodied by computer readable instructions, data structures, program modules, etc.

It is appreciated that the illustrated computing device 400 is only one example of a suitable device and is not intended to suggest any limitation as to the scope of use or functionality of the various embodiments described. Other well-known computing devices, systems, environments and/or configurations that may be suitable for use with the embodiments include, but are not limited to personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, and/or the like.

Additional and Alternative Implementation Notes

The above-described techniques pertain to primary synchronization signal detection. Although the techniques have been described in language specific to structural features and/or methodological acts, it is to be understood that the appended claims are not necessarily limited to the specific features or acts described. Rather, the specific features and acts are disclosed as example forms of implementing such techniques. Those skilled in the art may make derivations and/or modifications of any of the disclosed embodiments or any variations thereof, and such derivations and modifications are still within the scope of the present disclosure.

In the above description of example implementations, for purposes of explanation, specific numbers, materials configurations, and other details are set forth in order to better explain the invention, as claimed. However, it will be apparent to one skilled in the art that the claimed invention may be practiced using different details than the example ones described herein. In other instances, well-known features are omitted or simplified to clarify the description of the example implementations.

The inventors intend the described embodiments to be primarily examples. The inventors do not intend these embodiments to limit the scope of the appended claims. Rather, the inventors have contemplated that the claimed invention might also be embodied and implemented in other ways, in conjunction with other present or future technologies.

Moreover, the word "example" is used herein to mean serving as an example, instance, or illustration. Any aspect or design described herein as "example" is not necessarily to be construed as preferred or advantageous over other aspects or designs. Rather, use of the word example is intended to present concepts and techniques in a concrete fashion. The term "techniques," for instance, may refer to one or more devices, apparatuses, systems, methods, articles of manufacture, and/or computer-readable instructions as indicated by the context described herein.

As used in the present disclosure, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

What is claimed is:

1. A method, comprising:
   receiving one or more signals at one or more antennas of a receiver;
   processing the one or more received signals by:
   decimation filtering the one or more received signals to provide one or more decimated signals each of which having a predetermined symbol size, and
   enumerating correlation of the one or more decimated signals with a plurality of reference signals to provide correlation results, the correlation results comprising a plurality of correlation output signals each of which corresponding to a respective one of the plurality of reference signals; and
   detecting a primary synchronization signal (PSS) based on the correlation results, wherein detecting the PSS comprises:
   searching a radio frame of each of the correlation output signals for a peak signal level to identify one or more candidate signal peaks;
   searching for an accompanying signal peak at or within one half radio frame of each peak signal level to identify one or more candidate accompanying signal peaks; and
   determining one of the plurality of reference signals as the PSS based at least in part on the one or more candidate signal peaks and the one or more candidate accompanying signal peaks.

2. The method of claim 1, wherein the processing the one or more received signals comprises processing the one or more received signals independently and concurrently.

3. The method of claim 1, wherein the processing the one or more received signals comprises processing the one or more received signals independently and sequentially such that one of the one or more received signals is processed at a time.

4. The method of claim 1, wherein the processing the one or more received signals comprises:
   summing the one or more received signals to provide a summed signal; and
   processing the summed signal,
   wherein the decimation filtering the one or more received signals comprises decimation filtering the summed signal.

5. The method of claim 1, wherein the receiving one or more signals comprises receiving the one or more signals in association with the Long Term Evolution-Advanced (LTE-A) standard.

6. The method of claim 1, wherein the plurality of reference signals comprise three possible candidate PSS reference signals.

7. The method of claim 1, wherein the decimation filtering comprises decimation filtering in a time domain.

8. The method of claim 1, wherein the decimation filtering comprises decimation filtering in a frequency domain.

9. The method of claim 1, further comprising:
   performing one or more of:
   identifying a cell identification of a cell in which the receiver operates;
   monitoring an adjacent cell;
   establishing symbol alignment pursuant to detecting the PSS;
   performing half-frame synchronization; and
   calculating initial frequency equalizer tap values.

10. A processor, comprising:
    a first module configured to decimation filter one or more signals, received by one or more antennas, to provide one or more decimated signals each of which having a predetermined symbol size;
    a second module coupled to the first module and configured to enumerate correlation of the one or more decimated signals with a plurality of reference signals to provide correlation results, the correlation results comprising a plurality of correlation output signals each of which corresponding to a respective one of the plurality of reference signals; and a third module coupled to the second module and configured to detect a primary synchronization signal (PSS) based on the correlation results, wherein the third module is configured to detect the PSS by performing operations comprising:

searching a radio frame of each of the correlation output signals for a peak signal level to identify one or more candidate signal peaks;

searching for an accompanying signal peak at or within one half radio frame of each peak signal level to identify one or more candidate accompanying signal peaks; and determining one of the plurality of reference signals as the PSS based at least in part on the one or more candidate signal peaks and the one or more candidate accompanying signal peaks.

11. The processor of claim 10, wherein the first module decimation filters the one or more signals independently and concurrently.

12. The processor of claim 10, wherein the first module decimation filters the one or more signals independently and sequentially such that one of the one or more signals is processed at a time.

13. The processor of claim 10, wherein the first module sums the one or more signals to provide a summed signal and decimation filters the summed signal.

14. The processor of claim 10, wherein the plurality of reference signals comprise three possible candidate PSS reference signals.

15. A non-transitory computer-readable medium having a set of computer-executable instructions stored thereon that, when executed by one or more processors, cause the one or more processors to perform operations comprising:

processing one or more signals received by one or more antennas of a receiver, the processing comprising:

decimation filtering the one or more signals to provide one or more decimated signals each of which having a predetermined symbol size, and enumerating correlation of the one or more decimated signals with a plurality of reference signals to provide correlation results, the correlation results comprising a plurality of correlation output signals each of which corresponding to a respective one of the plurality of reference signals; and detecting a primary synchronization signal (PSS) based on the correlation results by performing operations comprising:

searching a radio frame of each of the correlation output signals for a peak signal level to identify one or more candidate signal peaks;

searching for an accompanying signal peak at or within one half radio frame of each peak signal level to identify one or more candidate accompanying signal peaks; and determining one of the plurality of reference signals as the PSS based at least in part on the one or more candidate signal peaks and the one or more candidate accompanying signal peaks.

16. The non-transitory computer-readable medium of claim 15, wherein processing one or more signals comprises processing the one or more signals independently and concurrently.

17. The non-transitory computer-readable medium of claim 15, wherein the processing one or more signals comprises processing the one or more signals independently and sequentially such that one of the one or more signals is processed at a time.

18. The non-transitory computer-readable medium of claim 15, wherein the processing one or more signals comprises:

summing the one or more signals to provide a summed signal; and processing the summed signal, wherein decimation filtering the one or more received signals comprises decimation filtering the summed signal.

19. The non-transitory computer-readable medium of claim 15, wherein the plurality of reference signals comprise three possible candidate PSS reference signals.

20. The non-transitory computer-readable medium of claim 15, wherein the operations further comprise:

performing one or more of:

identifying a cell identification of a cell in which the receiver operates;

monitoring an adjacent cell;

establishing symbol alignment pursuant to the detecting the PSS;

performing half-frame synchronization; and calculating initial frequency equalizer tap values.

\* \* \* \* \*